Feb. 15, 1927.
S. J. BENS
1,617,566
CHAIN SAW LINK AND BUSHING THEREFOR
Original Filed April 23, 1921
*Fig. 1.*
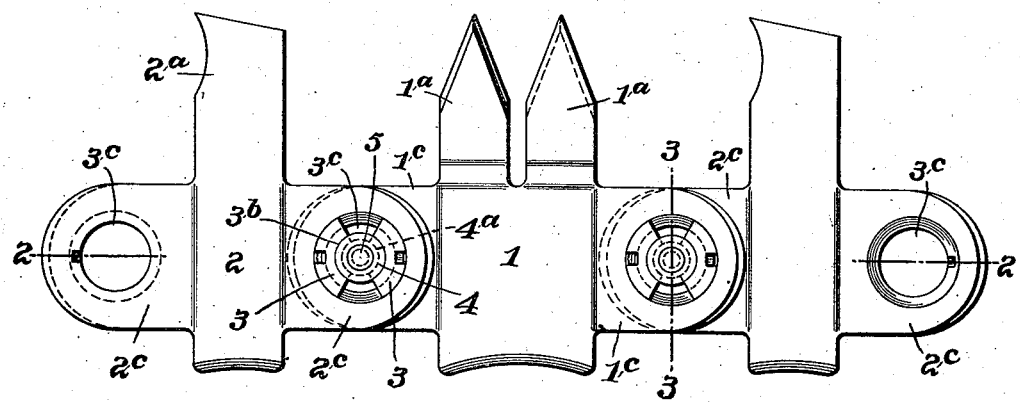
*Fig. 2.*
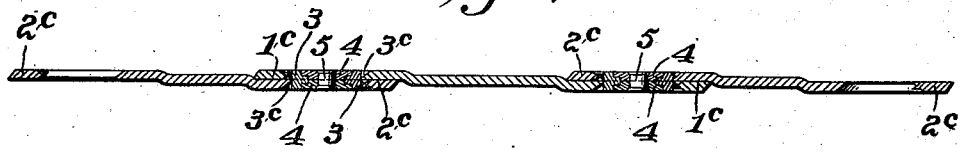
*Fig. 3.*  *Fig. 4.*  *Fig. 7.*
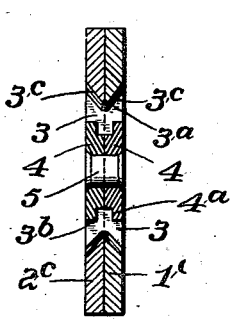
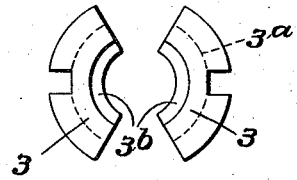
*Fig. 5.*  *Fig. 8.*
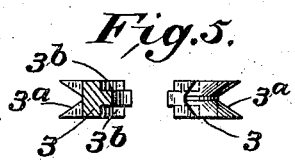
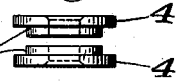
*Fig. 9.*
*Fig. 6.*
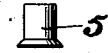
Inventor:
Samuel J. Bens,
by Spear Middleton Donaldson + Hall,
Attys.

Patented Feb. 15, 1927.

1,617,566

UNITED STATES PATENT OFFICE.

SAMUEL J. BENS, OF NEW YORK, N. Y., ASSIGNOR TO CHAIN SAW CORPORATION, OF WILMINGTON, DELAWARE, A CORPORATION OF DELAWARE.

CHAIN-SAW LINK AND BUSHING THEREFOR.

Application filed April 23, 1921, Serial No. 463,832. Renewed May 16, 1925.

My present invention relates to improvements in chain saws and aims to provide improved means for pivotally connecting together the links thereof with a view to facilitating the manufacture and increasing the durability of the saw.

The invention includes the novel features of construction and arrangement and combination of parts hereinafter described and particularly defined by the appended claims.

An embodiment of my invention is illustrated in the accompanying drawing in which, Fig. 1 is a face view of three connected links forming a part of a saw;

Fig. 2 is a section on line 2—2 of Fig. 1;

Fig. 3 is a section on line 3—3 of Fig. 1; and,

Figs. 4 to 9 inclusive are views of details.

Referring by reference characters to this drawing, I have shown in Figs. 1 and 2 three connected links forming part of a chain saw, these links being preferably of the type forming the subject of a separate application of even date herewith, it being understood that the improved pivot joint forming the subject of the present application is not limited to use in connection with this particular form of link though specially adapted thereto.

The links are designated 1 and 2 respectively and they are provided with overlapping ears 1ᶜ and 2ᶜ at opposite ends, these ears being offset from the plane of the intermediate or tooth carrying portions. Said overlapping ears are provided with aligning circular openings, 3ᶜ, having reversely beveled or flared edges or walls as shown clearly in Fig. 3. Within said openings are placed a pair of arc-shaped bushings 3, shown in detail in Figs. 4, 5 and 6, which have V-shaped peripheries 3ᵃ designed to engage the reversely flared walls of the openings to hold the ears together. The arc-shaped bushings are held in contact with the flared walls by a two-part bushing 4 (Figs. 7 and 8), preferably of case hardened steel, the parts of which are countersunk into the bushings 3, preferably by rebating the latter as indicated at 3ᵇ and correspondingly rebating the bushing parts 4 as indicated at 4ᵃ.

After the two parts of the bushing 4 are assembled as shown in Fig. 3, they are held together by a soft metal rivet 5 which can be easily and quickly applied.

By this arrangement the parts which move on each other can be made of hardened metal, and the only part which needs upsetting, to wit, the rivet, receives no wear and can be made of soft metal.

This arrangement also enables the rivet ends to be countersunk in the bushing parts and a perfectly flush exterior joint secured.

As will be evident to those skilled in the art, my invention permits of various modifications without departing from the spirit thereof or the scope of the appended claims.

Having thus described my invention, what I claim is:

1. In combination, a pair of overlapping links having aligning openings provided with flaring walls, arc-shaped bushings having V-shaped peripheries engaging said flaring walls, a two-part bushing having its parts countersunk into said arc-shaped bushings from opposite sides, and means for holding the parts of said two-part bushing together.

2. In combination, a pair of overlapping links having aligning openings provided with flaring walls, arc-shaped bushings having V-shaped peripheries engaging said flaring walls, and rebated inner surfaces, a two-part bushing having its parts provided with edge rebates to fit the rebates of the arc-shaped bushings, and a rivet holding said parts together.

3. In combination, a pair of overlapping links having aligning openings, arc-shaped bushings having flanged peripheries countersunk into said links, a two-part bushing having its parts countersunk into said arc-shaped bushings, and means for holding the bushing parts together.

4. In combination, a pair of overlapping links having aligning openings, arc-shaped bushings having flanged peripheries countersunk into said links, a two-part bushing having its parts countersunk into said bushing from opposite sides, and a rivet passing through said two-part bushing and having its ends upset into countersinks in the ends of said bushing parts, the ends of said bushings and rivets all being flush with the outer faces of the links.

In testimony whereof, I affix my signature.

SAMUEL J. BENS.